United States Patent [19] [11] 4,269,752
Zamek et al. [45] May 26, 1981

[54] POLYESTER IMIDE WIRE ENAMELS

[75] Inventors: Otto S. Zamek, Schenectady; Denis R. Pauze, Scotia, both of N.Y.; Richard J. Jablonski, Coshoston, Ohio

[73] Assignee: General Electric Company, Schenectady, N.Y.

[21] Appl. No.: 40,218

[22] Filed: May 18, 1979

[51] Int. Cl.³ .......................... C08K 5/06; C08K 5/10
[52] U.S. Cl. .............. 260/31.4 R; 260/31.6; 260/33.2 R; 428/458
[58] Field of Search ............ 260/31.4 R, 31.6, 33.2 R

[56] References Cited

U.S. PATENT DOCUMENTS

| | | | |
|---|---|---|---|
| 3,141,859 | 7/1964 | Sheffer et al. | 260/33.4 |
| 3,274,159 | 9/1966 | Kluiber | 260/75 |
| 3,382,203 | 5/1968 | Rafing et al. | 260/33.4 |
| 3,426,098 | 2/1969 | Meyer et al. | 260/841 |
| 4,119,605 | 10/1978 | Keating | 260/33.2 R |
| 4,119,608 | 10/1978 | Keating | 260/33.4 R |
| 4,119,758 | 10/1978 | Keating | 428/379 |
| 4,127,553 | 11/1978 | Osada et al. | 260/33.2 R |

FOREIGN PATENT DOCUMENTS 973377 10/1964 United Kingdom .

*Primary Examiner*—Harry Wong, Jr.
*Attorney, Agent, or Firm*—Morgan, Finnegan, Pine, Foley & Lee

[57] ABSTRACT

Superior wire enamels comprise polyester imides prepared in the presence of a monophenyl ether of a glycol having a free secondary hydroxyl group and dissolved in a solvent comprising predominantly a polar oxygenated compound selected from a monoether or monoester of an alkylene, or polyalkylene, glycol. Electrical conductors coated with such enamels are also disclosed.

6 Claims, No Drawings

POLYESTER IMIDE WIRE ENAMELS

This invention relates to polyester imide wire enamels and to electrical conductors coated therewith. More particularly, it is concerned with ester imides prepared in the presence of a monophenyl ether of a glycol having a secondary hydroxyl group and dissolved in a non-phenolic solvent which is predominantly polar and oxygenated.

BACKGROUND OF THE INVENTION

British Pat. No. 973,377 discloses a family of ester imide resins made by reacting together at least one polybasic acid or a functional derivative thereof, and at least one polyhydric alcohol or functional derivative thereof, at least one of the reactants having at least one five-membered imide ring between the functional groups of the molecule. It further discloses that the reactants can be heated in a commercial cresol mixture, then further diluted in a mixture of naphtha and cresol and used as an enamel for coating copper wire to produce a hard, thermally resistant insulation therefor. U.S. Pat. No. 3,426,098 describes ester imide resins in which all or part of the polyhydric alcohol comprises tris(2-hydroxyethyl) isocyanurate. U.S. Pat. No. 3,382,203 describes polyester wire coating enamels based on mixed esters containing aromatic polycarboxylic acid radicals and radicals of di- and/or polyhydric alcohols, and specifically contemplates the inclusion of imide containing units. A preference is stated for cresol as a solvent. U.S. 3,274,159 describes polyester polyimides of trimellitic anhydride in which a glycol reactant is stated to be present in excess of stoichiometric proportions when no solvent is employed in the polymerization reaction. Such polyester polyimides are stated to be useful as outdoor wire insulation material. U.S. Pat. No. 3,141,859 acknowledges that certain esters and ethers of ethylene glycol and polyethylene glycol can be used in the preparation of alkyd resins to make wire enamels, but it is not disclosed if such compounds are mono- or di- ethers and esters, and, in any event, the statement is made that "completely satisfactory wire enamels have not been obtained by such a process." The disclosures of the foregoing patents are incorporated herein by reference.

Keating, U.S. Pat. Nos. 4,119,605, 4,119,608; and 4,119,758, incorporated herein by reference, discloses polyester-imide resins which are soluble in non-phenolic solvents by incorporating a monoether of a diethylene glycol or a triethylene glycol into the resin. It is stated therein that the use of the monoether of a glycol as a reactant which serves as a monofunctional alcohol serves to control the molecular weight and solubility of the polymer and permits the manufacture of wire enamels which contain relatively non-toxic solvents in place of phenols and also permits the attainment of enamels having economical high solids contents. The reactive glycol dealt with by the abovementioned Keating patents is an ether alcohol which either (a) has the formula $RO(C_nH_{2n}O)_xH$ where R is an alkyl group of 1 to 6 carbon atoms or phenyl, n is 2 or 3 and x is 2 or 3 or (b) is the monophenyl ether of ethylene glycol.

Enamels prepared with such reactive monohydric alcohols are not entirely satisfactory in comparison with conventional polyester imides because, while reacting the ether alcohol into the resin lowers its molecular weight and improves solubility, it also tends to reduce ultimate physical properties precisely because the molecular weight has been lowered.

It has now been discovered that if polyester imide resins are prepared in the presence of a monophenyl ether of a branched aliphatic glycol having at least 3 carbon atoms in the aliphatic chain and in which the monohydric alcohol group is a secondary alcohol group, e.g., 1-phenoxy-2-propanol, then there is little tendency for the glycol ether to react into the resin, and the molecular weight is higher than it would be if a glycol ether of the type described in the Keating patents is employed. The result is that a superior wire enamel can be made by dissolving such higher molecular weight resins in a solvent comprising predominantly the same, or different, polar organic monoethers or monoesters of alkylene glycols or polyalkylene glycols. The present enamels are clear solutions, even without chemically binding in the glycol ether. They thus eliminate the need for cresylic acid solvent and therefore provide excellent results without any toxic effluents.

DESCRIPTION OF THE INVENTION

According to the present invention, there are provided electrical wire enamels comprising:
(a) a polyester imide obtained by heating ingredients consisting essentially of
  (i) an aromatic diamine;
  (ii) an aromatic carboxylic anhydride containing at least one additional carboxylic group;
  (iii) terephthalic acid or a reactive derivative thereof;
  (iv) a polyhydric alcohol having at least three hydroxyl groups;
  (v) an alkylene glycol; and
  (vi) 1-phenoxy-2-propanol until reaction therebetween is substantially complete; and
(b) a solvent therefor comprising predominantly
  (i) an alkylene glycol monoether or monoester.
  (ii) a polyalkylene glycol monoether or monoester or
  (iii) a mixture of (i) and (ii).

Among the preferred features of the present invention are electrical wire enamels as defined above which also include an alkyl titanate.

Also contemplated by the present invention are electrical conductors provided with a continuous coating of the new wire enamels, and cured at elevated temperatures.

With respect to components a(i)-a(v) inclusive these are conventional and well known to those skilled in this art by reason of the teachings, for example, in the above-mentioned U.K. Patent Specification No. 973,377, and U.S. Pat. No. 3,426,098.

By way of illustration, aromatic diamine component (a)(i) can comprise benzidine, methylene dianiline, oxydianiline, diaminodiphenyl ketone, -sulfone, -sulfoxide, phenylene diamine, tolylene diamine, xylene diamine, and the like. Preferably, component (a)(i) will comprise oxydianiline or methylenedianiline, and especially preferably, methylenedianiline.

Illustratively, the aromatic carboxylic anhydride containing at least one additional carboxylic group component (a) (ii) can comprise pyromellitic anhydride, trimellitic anhydride, naphthalene tetracarboxylic dianhydride, benzophenone-2,3,2',3'-tetracarboxylic dianhydride, and the like. The preferred components (a)(ii) are pyromellitic anhydride or trimellitic anhydride and especially trimellitic anhydride.

Typically, terephthalic acid or a di(lower)alkyl ester ($C_1$-$C_6$) or other reactive derivative, e.g., amide, acyl halide, etc. will be used as component (a)(iii). A minor amount of the terephthalic acid can be replaced with another dicarboxylic acid or derivative, e.g., isophthalic acid, benzophenone dicarboxylic acid, adipic acid, etc. Preferably component (a)(iii) will comprise dimethyl terephthalate or terephthalic acid, and especially preferably, terephthalic acid.

As optional polyester forming ingredients (a)(iv) there may be employed a polyhydric alcohol having at least three hydroxyl groups, there can be used glycerine, pentaerythritol, 1,1,1-trimethylolpropane, sorbitol, mannitol, dipentaerythritol, tris(2-hydroxyethyl)isocyanurate (THEIC), and the like. Preferably as component (a)(iv) there will be used glycerine or tris(2-hydroxyethyl) isocyanurate, preferably the latter.

Illustratively, the alkylene glycol component (a)(v) will comprise ethylene glycol, 1,4-butanediol, trimethylene glycol, propylene glycol, 1,5-pentanediol, 1,4-cyclohexane dimethanol and the like. Preferably the alkylene glycol will be ethylene glycol.

The 1-phenoxy-2-propanol component (vi) can be made in known ways, and it is also available commercially. It has a molecular weight of 152.2, and a freeze point of about 11.4° C. Its boiling point at 760 mm Hg. is 242.7° C. It is sold by Dow Chemical Co., Midland, Michigan 48640, U.S.A. under the tradename DOWANOL PPh.

The polar oxygenated solvent (b) having at least one active hydroxyl group will be selected from (i) an alkylene glycol monoether or monoester, such as ethylene glycol monomethyl ether, or monoester, such as ethylene glycol monomethyl ether, ethylene glycol mono-n-butyl ether, ethylene glycol monohexyl ether, ethylene glycol monoacetate, ethylene glycol monohexanoate, propylene glycol monomethyl ether, propylene glycol monoacetate, 1,4-butylene glycol mono-n-butyl ether, 1,6-hexylene glycol monomethyl ether, and the like, preferably ethylene glycol monomethyl ether and ethylene glycol monophenyl ether, and for (ii) a polyalkylene glycol monoether or monoester, such as diethylene glycol monoethyl ether, diethylene glycol mono-n-butyl ether, diethylene glycol monoacetate, diethylene glycol monophenyl ether, triethylene glycol monomethyl ether, triethylene glycol monoacetate, etc. Preferably, there will be used diethylene glycol monomethyl or diethylene glycol monobutyl ether.

Suitable alkyl titanates include tetraisopropyl titanate, tetramethyl titanate, tetrabutyl titanate, tetrahexyltitanate, bis(acetoacetonyl)diisopropyl titanate and the like. Tetraisopropyl titanate is preferred.

In making the polyester imide there should normally be an excess of alcohol groups over carboxyl groups in accordance with conventional practice. The preferred ratios of ingredients, and of ester groups to imide groups, are entirely conventional, see the patents cited above, and the especially preferred ratios of ingredients will be exemplified in detail hereinafter. The manner of making the polyester imide is likewise conventional. Either the polyester or the polyimide components can be made first, and subsequently reacted at elevated temperatures, or all of the ingredients can be added at the beginning and reacted. Preferably, the ingredients are all added to a suitable reactor and heated to 200° to 250° C. until no more water distills off. This indicates substantial completion of the reaction. This may take several hours. Then the mixture is cooled somewhat, e.g., to 150° to 190° C. and then glycol ether or ester is added as solvent, preferably with a minor proportion of a hydrocarbon diluent, e.g., an aromatic naphtha, such as Solvesso 100 or toluene, dodecane, and the like.

The wire enamels thus made are applied to an electrical conductor, e.g., copper, silver or stainless steel wire, in conventional fashion. Illustratively, wire speeds of 15 to 65 feet/min. can be used with wire tower temperatures of 250° to 900° F. The build up of coating on the wire can be increased by repetitive passes through the enamel. The coatings produced from the present enamels have excellent smoothness, flex resistance, continuity, solvent resistance, heat aging, dissipation factors, cut through resistance, heat shock, abrasion resistance and dielectric strength.

DESCRIPTION OF THE PREFERRED EMBODIMENTS

The following examples illustrate the present invention. They are not intended to limit the scope of the claims in any manner whatsoever.

EXAMPLE 1

A wire enamel is made by charging a suitably sized flask with the following reactants

|  | Gms |
| --- | --- |
| Tris(2-hydroxyethyl)isocyanurate | 1066.9 |
| Trimellitic anhydride | 746.2 |
| Methylenedianiline | 387.5 |
| Ethylene glycol | 278.5 |
| Terephthalic acid | 757.3 |
| Tetraisopropyltitanate | 6.02 |
| 1-Phenoxy-2-propanol | 574.9 |

The contents are heated slowly with the evolution of water to a maximum temperature of 230° C. until no more water is given off. The contents are allowed to cool to 200° C. and poured into a metal tray to solidify.

Resin, 700 g., is dissolved in 386 g. of the monomethyl ether of diethylene glycol and 141 g. of hydrocarbon solvent (Solvesso-100). To this solution is added 36.9 g. of phenolic resin in 40 g. of diethylene glycol monomethyl ether and 14.9 g. of tetraisopropyltitanate in 30 g. of diethylene glycol monomethyl ether and 10 g. of Solvesso-100. The clear amber solution has a viscosity of 1290 centistokes (cs) at 25° C. and a solids content of 46.44%.

When applied in a 15 foot vertical tower at 900° F. on 18 AWG copper in 7 passes, a coated wire having the following properties are obtained at 50'/min.

Cut Thru, °C.—395

For comparison purposes a wire enamel of this type is made substituting a reactive monophenyl ether of ethylene glycol and dimethyl terephthalate for terephthalic acid.

COMPARATIVE EXAMPLE 1A

The following materials are reacted in a suitably-sized flask:

|  | GMS |
| --- | --- |
| tris(2-hydroxyethyl)isocyanurate | 301 |
| Trimellitic anhydride | 221 |
| Methylenedianiline | 114 |

| | GMS |
|---|---|
| Ethylene glycol | 93 |
| Dimethyl terephthalate | 257 |
| Tetraisopropyltitanate | 0.34 |
| Ethylene glycol monophenyl ether | 335 |

The contents are heated slowly with the evolution of water and methanol collected in a Dean Stark trap. The contents are heated to a maximum of 240° C. until the theoretical amount of water is collected. To the clear solution is added, at 180° C., 487 gms. of monomethyl ether of diethylene glycol. The contents are allowed to cool to 150° C. then 205 gms. Solvesso 100 naphtha solvent is added. The clear amber solution has a viscosity of 470 cs at 25° C. and a solids content of 50.8%.

When applied on a 15 foot vertical tower at 900° F. on 18 AWG copper in 7 passes, a coated wire having the following properties is obtained at 40'/min.:
Cut Thru, °C.—360

EXAMPLE 2

A suitably sized flask is charged with the following:

| | GMS |
|---|---|
| Tris-(2-hydroxyethyl)isocyanurate | 955.5 |
| Trimellitic anhydride | 927.6 |
| Methylenedianiline | 522.1 |
| Ethylene glycol | 238.4 |
| Terephthalic acid | 583.3 |
| Tetraisopropyltitanate | 6.0 |
| 1-Phenoxy-2-propanol | 584.0 |

The contents are heated slowly with the evolution of water to a maximum temperature of 225° C. until no more water is given up. The contents are allowed to cool to 200° C. and poured into a metal tray to solidify.

Resin, 700 g., is dissolved in 484 g. of the monomethylene glycol and 161 g. of Solvesso-100. To this solution is added 11.6 g. of tetraisopropyltitanate in 30 g. of diethylene glycol monomethyl ether and 10 g. of Solvesso-100. The clear amber solution has a viscosity of 978 cps. at 25° C. and a solids content of 43.8%.

When applied in a 15 foot vertical tower at 900° F. on 18 SWG copper in 7 passes, a coated wire having the following properties is obtained at 50'/min.
Cut Thru, °C.—362
Heat Shock 0% 30 min. at 200° C.—2X For comparison purposes a wire enamel of this type is made substituting a reactive monobutyl ether of diethylene glycol for the substantially non-reactive 1-phenoxy-2-propanol.

COMPARATIVE EXAMPLE 2A

A flask is charged with the following

| | GMS |
|---|---|
| Tris(2-hydroxyethyl)isocyanurate | 301.2 |
| Trimellitic anhydride | 221.6 |
| Methylenedianiline | 114.2 |
| Ethylene glycol | 93 |
| Terephthalic acid | 220.5 |
| Tetraisopropyltitanate | .34 |
| Diethylene glycol monobutyl ether | 210.5 |

The contents are heated slowly with the evolution of water to a maximum temperature of 225° C. until no more water is given off. The contents are allowed to cool to 180° C. at which time 632 gms of monomethyl ether of diethylene glycol is added along with 211 gms of Solvesso 100. The contents are filtered. Final solids are 45% with a viscosity of 550 cps at 25° C.

The enamel is run at 50'/min. on a wire tower at 900° F. using 7 passes on 18 AWG copper wire. A coated wire having the following properties is obtained:
Flex 25%—1X
Cut Thru, °C.—249
Heat Shock 0%-30°'-200° C.—3X In all cases it is seen that coated wires having improved properties, especially cut through and heat shock, are obtained when the polyester imide is prepared in the presence of substantially non-reactive 1-phenoxy-2-propanol.

It is obviously possible to make many variations in the present invention in light of the above, detailed description. For example, the alkyl titanate can be omitted. A polyisocyanate, 1 to 25% based on resin, can be added, phenol-formaldehyde resin can be omitted or it can be substituted with a melamine-formaldehyde resin. Metal driers can also be added, e.g., 0.2 to 1.0% based on total solids, of zinc octoate, cadmium linoleate, calcium octoate, and the like. Instead of the monomethyl ether or diethylene glycol used as solvent, there can be used the monobutyl ether of diethylene glycol. The following monoester alcohols can be used: ethylene glycol monoacetate and diethylene glycol monoacetate. All such obvious variations are within the full intended scope of the appended claims.

What is claimed is:
1. An electrical wire enamel comprising:
   (a) a polyester imide obtained by heating ingredients consisting essentially of
      (i) an aromatic diamine;
      (ii) an aromatic carboxylic anhydride containing at least one additional carboxylic group;
      (iii) terephthalic acid or a di($C_1$–$C_6$) alkyl ester, amide or acyl halide thereof;
      (iv) a polyhydric alcohol having at least three hydroxyl groups;
      (v) an alkylene glycol; and
      (vi) an effective amount of 1-phenoxy-2-propanol to reduce molecular weight abatement until reaction therebetween is substantially complete; and
   (b) a solvent therein comprising predominantly
      (i) an alkylene glycol monoether or monoester,
      (ii) a polyalkylene glycol monoether or monoester or
      (iii) a mixture of (i) and (ii).
2. An electrical wire enamel as defined in claim 1 which also includes an alkyl titanate.
3. An electrical wire enamel comprising
   (a) a polyester imide obtained by heating ingredients consisting essentially of
      (i) methylene dianiline:
      (ii) trimellitic anhydride;
      (iii) terephthalic acid;
      (iv) tris(2-hydroxyethyl)isocyanurate;
      (v) ethylene glycol; and
      (vi) an effective amount of 1-phenoxy-2-propanol to reduce molecular abatement until reaction therebetween is substantially complete; and
   (b) a solvent therefor comprising predominantly
      (i) diethylene glycol mono-n-butyl ether, diethylene glycol monomethyl ether or a mixture thereof.

4. An electrical wire enamel as defined in claim 3 which also includes tetraisopropyl titanate.

5. An electrical wire enamel comprising
  (a) a polyester imide obtained by heating ingredients consisting essentially of
    (i) an aromatic diamine selected from the group consisting of benzidine, methylene dianiline, oxydianiline, diaminodiphenyl ketone, diaminodiphenyl sulfone, diaminodiphenyl sulfoxide, phenylene diamine, tolylene diamine and xylene diamine;
    (ii) an aromatic carboxylic anhydride selected from the group consisting of pyromellitic anhydride, trimellitic anhydride, naphthalene tetracarboxylic dianhydride and benzophenone-2,3,2',3'-tetracarboxylic dianhydride;
    (iii) terephthalic acid or a di alkyl ester, amide or acyl halide thereof;
    (iv) a polyhydric alcohol selected from the group consisting of glycerine, pentaerythritol, 1,1,1-trimethylolpropane, sorbitol, mannitol, dipentaerythritol and tris(2-hydroxymethyl) isocyanurate;
    (v) an alkylene glycol selected from the group consisting of ethylene glycol, 1,4-butanediol, trimethylene glycol, propylene glycol, 1,5-pentanediol and 1,4-cyclohexane dimethanol; and
    (vi) an effective amount of 1-phenoxy-2-propanol to reduce molecular weight abatement until reaction therebetween is substantially complete; and
  (b) a solvent therein comprising predominantly
    (i) an alkylene glycol monoether or monoester;
    (ii) a polyalkylene glycol monoether or monoester, or
    (iii) a mixture of (i) and (ii).

6. An electrical wire enamel as defined in claim 5 which also includes an alkyl titanate.

* * * * *